United States Patent Office 3,349,670
Patented Oct. 31, 1967

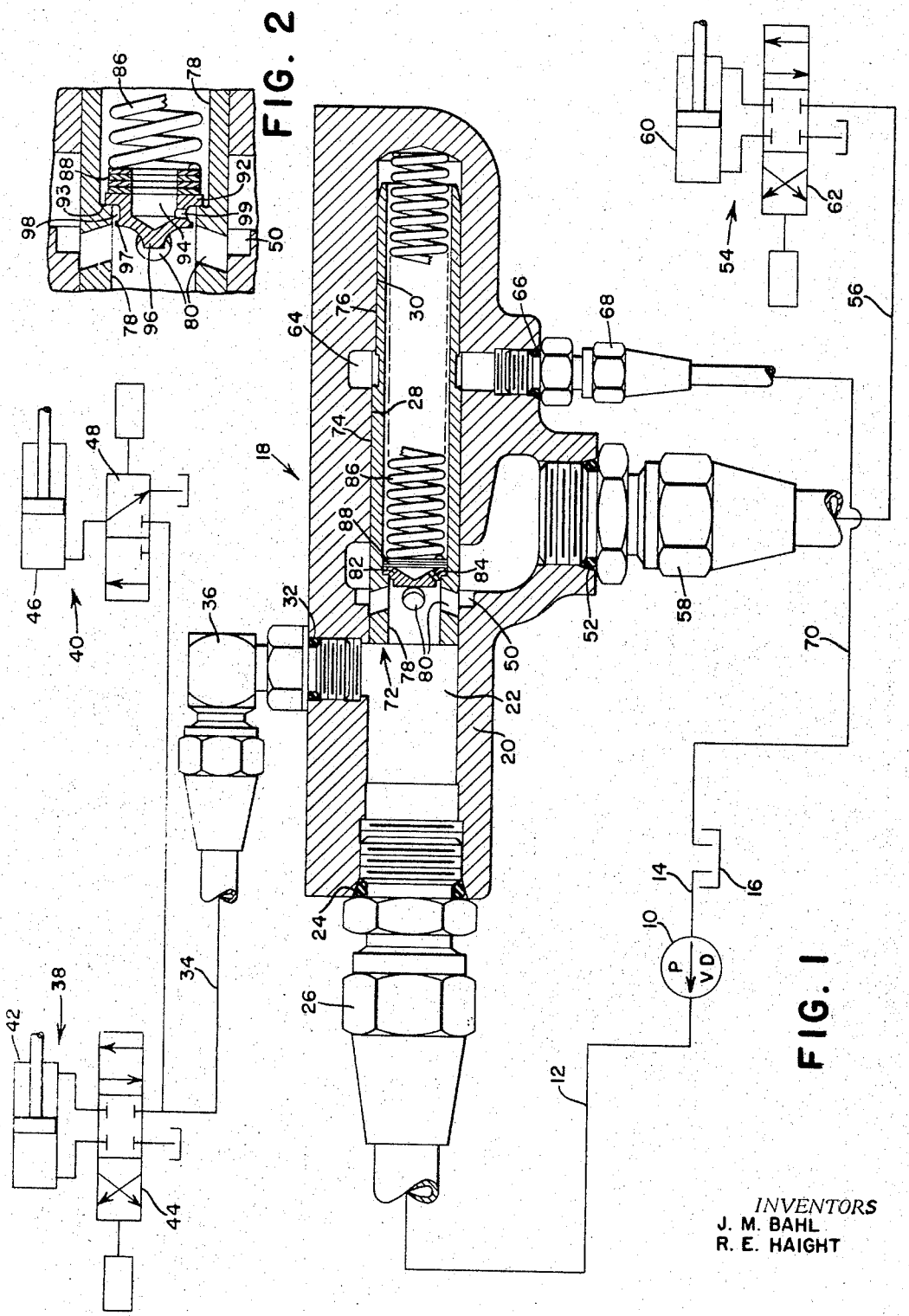

3,349,670
HYDRAULIC CONTROL VALVE
James M. Bahl and Robert E. Haight, Waterloo, Iowa, assignors to Deere & Company, Moline, Ill., a corporation of Delaware
Filed Dec. 20, 1965, Ser. No. 514,882
3 Claims. (Cl. 91—412)

ABSTRACT OF THE DISCLOSURE

A hydraulic system having a single source of fluid pressure, a pair of primary hydraulic motors, a secondary hydraulic motor, and a priority control valve for shutting off the fluid pressure supply to the secondary hydraulic motor when the flow rate required by the motors exceeds the pump capacity and causes a reduction in pressure below a predetermined value, thereby providing the primary hydraulic motors with priority to fluid pressure supply.

---

This invention relates to a hydraulic control valve and more particularly to a hydraulic valve which supplies fluid pressure to a plurality of hydraulic functions, providing priority to the fluid pressure supply for one or more of the functions.

Frequently a hydraulic system includes a plurality of hydraulic motors or functions connected in parallel to the discharge side of a fluid pump of limited capacity, and the power demand of the system can at times exceed the pump capacity. For example, on many agricultural tractors, a single pump generally supplies fluid pressure for the power steering, power brakes, and various other hydraulic functions such as a tractor-mounted backhoe, a rockshaft on the tractor, or hydraulically actuated implement controls. For convenient and safe operation of such a tractor, it is desirable that the power steering and brakes have priority to the fluid pressure supply over the remaining hydraulic functions.

According to the present invention, a valve is provided in a hydraulic system for assuring priority to one or more hydraulic functions, and more specifically for providing priority to the hydraulically actuated brakes and/or steering in a tractor hydraulic system.

Another object of the invention is to provide such a valve which will supply fluid under pressure to all hydraulic functions when the pressure is above a predetermined level and which will restrict and eventually interrupt the flow of fluid to certain hydraulic functions as the pressure falls below said predetermined level due to the inability of the pump to satisfy the demands of all the functions, and further to provide means for adjusting the fluid pressure level at which flow to the secondary functions is restricted.

Another feature of the invention resides in the provision of means within the valve for compensating for flow reaction forces on the valve. It is known that when fluid under pressure flows through a piston-type valve, certain forces are created on the piston, the axial components of which tend to shift the piston. These flow reaction forces depend on many factors, such as the radial clearance between the valve components, the axial opening of the valve, the configuration of the land, the diameter of the valve, and the direction and velocity of the fluid flow. It is another object of the invention to provide a pressure imbalance at opposite ends of the valve piston to counteract the flow reaction forces that tend to close the valve.

It is still another object to provide such a valve of simple, compact, and rugged construction, inexpensive to manufacture and maintain.

These and other objects will become apparent from the following detailed description and accompanying drawings wherein:

FIG. 1 is a partly schematic and partly sectional view of a hydraulic system including the novel valve, the system being shown in a non-priority condition wherein pressure is supplied to all hydraulic functions.

FIG. 2 is an enlarged fragmentary section of the valve showing a slightly different embodiment of the flow reaction compensation means.

The hydraulic system includes a variable displacement pump 10 having a discharge line 12 and an intake line 14 connected to a reservoir 16. A priority-type control valve is indicated generally by the numeral 18 and includes a valve body 20 having an elongated valve bore 22 closed at one end and forming an inlet port 24 at the other end connected to the discharge line 12 by means of a fitting 26. The valve bore 22 has a larger diameter portion 28 at the intake end and a portion of lesser diameter 30 at its distal end.

A first or priority valve port 32 is in communication with the larger diameter portion 28 and is connected to a priority outlet line 34 by a fitting 36. A pair of priority hydraulic motors are respectively indicated in general by the numerals 38 and 40 and are connected in parallel to the outlet line 34. The hydraulic motor 38 may be considered as representing a tractor power steering system, which conventionally includes a two-way hydraulic cylinder 42 and a manually actuated control valve 44 for directing fluid pressure to either end of the hydraulic cylinder 42 to steer the vehicle in either direction. The other priority hydraulic motor 40 may be considered as representing a tractor power brake system which conventionally includes a plurality of one-way hydraulic cylinders 46 to which pressure is supplied through a manually actuated control valve 48.

The larger diameter bore portion 28 has an annular recess 50 connected to a secondary outlet port 52. A secondary hydraulic motor 54 is connected to the secondary outlet port 52 by a secondary line 56 and a fitting 58. The secondary hydraulic motor 54 can be considered as representing one or more conventional tractor hydraulic functions other than power steering or power brakes, such as a tractor-mounted backhoe, ground-working implement, or rockshaft, and includes a hydraulic cylinder 60 controlled by a manually actuated valve 62.

The bore 22 has a second annular recess 64 at the junction of the larger and the smaller diameter bore portions 28 and 30, the recess 64 being connected to the reservoir 16 via a bleed port 66, a fitting 68 and a bleed line 70. An elongated valve or piston 72 is slidably mounted in the bore 22 and has a larger diameter portion 74 conforming to the larger bore portion 28 and a smaller portion 76 conforming to the smaller bore portion 30. An axial bore 78 extends through the piston 72 and is in fluid communication with the outer periphery of the larger diameter piston portion 74 through a plurality of generally radial openings 80 extending between the bore 78 and the outer periphery of the piston 72 proximate to the inlet end of the piston. When the piston 72 is in an open position, as shown in FIG. 1, the radial openings or passages 80 are opposite the annular recess 50 so that the secondary outlet port 52 is connected to the bore 22 and consequently the inlet port 24.

A disk-like member 82 closes the bore 78 except for a small orifice 84 through the member 82, the radial opening 80 communicating with the bore 78 on the upstream or inlet side of the member 82 and the orifice 84 being proximate to a radial opening 80. The bore 78 and the orifice 84 form a pressure sensing passage or conduit interconnecting the bore 22 on opposite sides of the piston 72. A helical compression spring 86 extends between the end of the bore 22 and the member 82 biasing the piston 72 toward a closed position (to the left in FIG. 1). A plurality of shims 88 are inserted between the spring 86 and the member 82 to vary the compression of the spring and consequently the force exerted by the spring in any given position.

The pressure in the bore 22 acting on the larger piston diameter 28 exerts an axial force on the piston 72 in one direction while the pressure acting on the smaller piston diameter 30 exerts a lesser force in the opposite direction. The force exerted by the spring 86 supplements the fluid pressure force on the small piston diameter 30. However, when the pressure is above a predetermined value, the force differential due to the diference in piston diameters is greater than the spring force and the piston is maintained in an open position (toward the right in FIG. 1) wherein the radical openings 80 communicate with the annular recess 50 for supplying fluid pressure to the secondary hydraulic motors. If the pressure falls below the predetermined level, then the force differential due to the difference in piston diameters is less than the spring force and the piston 72 will move toward a closed position (to the left in FIG. 1) wherein the piston 72 closes the annular recess 50, preventing the flow of fluid to the secondary hydraulic motor 54. For any given difference in piston areas, the pressure level at which piston movement will occur depends on the force exerted by the spring 86, which may be adjusted by means of the shims 88 or other conventional spring adjusting means. For example, assuming a normal input pressure of approximately 2000 p.s.i. and a five percent differential in piston areas, if the larger piston diameter has an area of one square inch, there would be a fifty pound difference in the opposite axial forces exerted by the fluid pressure on the piston 72. If the spring 86 were adjusted to provide a spring force of forty-five pounds, the piston would remain in an open position. If the inlet pressure fell to 1800 p.s.i., the force differential due to the pressure would only be forty-five pounds and would be exactly counterbalanced by the spring force. If the pressure fell below 1800 p.s.i., the force differential would be less than forty-five pounds and the spring would move the piston toward a closed position.

Thus when the demand of the hydraulic motors 38, 40 and 54 exceeds the capacity of the pump 10, causing a decrease in inlet pressure, the valve 18 will interrupt or restrict the flow of fluid to the secondary motor means 54 assuring priority to the hydraulic motors 38 and 40. As soon as the fluid flow to the secondary motor is interrupted or restricted, the pressure will rapidly build up to the predetermined level and the piston 72 will seek a position to permit flow of fluid to the secondary motor 54. The interruption or restriction of fluid flow to the secondary motor 54 is generally of relatively short duration and continues only during the period when the power demand exceeds the supply.

As previously mentioned, the flow of fluid through the piston 72 creates flow reaction forces on the piston 72 which, for the particular configuration of the openings 80 and the recess 50, exert an axial force tending to move the piston 72 toward a closed position (to the left in FIG. 1). To counteract this flow reaction force, the flow of fluid to the secondary hydraulic motor 54 is directed through a piston bore 78 which has a substantially smaller diameter than the valve bore 22. The lesser diameter of the bore 78 causes a greater velocity of fluid flow in the bore 78 than in the valve bore 22 causing a corresponding reduction in pressure. The pressure sensing orifice 84 is located adjacent an area of greater fluid velocity and corresponding lesser fluid pressure, so that when fluid is flowing through the bore 78, the pressure at the smaller diameter end of the piston is less than the pressure at the larger diameter end of the piston. This pressure differential creates a force in the opposite direction of the flow reaction force, thereby counteracting said force. To further compensate for the flow reaction force, the generally radial openings or passages 80 are preferably inclined outwardly toward the inlet end of the piston 72, the center line of each opening 80 being canted approximately 70° relative to the axis of the piston 72 so that the fluid flowing through the bore 78 and the openings 80 is turned approximately 110°, creating a reaction force in the opposite direction from the previously described flow reaction force.

A slightly different embodiment of the closure member is shown in an enlarged scale in FIG. 2, the numeral 90 indicating the closure member or orifice plate which is mounted in the piston bore 78 in the same manner as the closure member 82. The member 90 has a shoulder 92 which is biased against a step 93 in the bore 78 by the spring 86 and also has an axial cavity 94 on its downstream or spring side. The member 90 also includes an axial projection 96 on its upstream or inlet side which flares to a diameter 97 slightly smaller than the bore diameter 78, providing a relatively small peripheral clearance between the diameter 97 and the bore 78. An annular recess 98 between the diameter 97 and the shoulder 92 is connected to the cavity 94 by a pressure sensing orifice 99. Thus, the bore 78, the clearance between the bore 78 and the diameter 97, the recess 98, the orifice 99, and the cavity 94 form a pressure sensing passage interconnecting the bore 22 on opposite sides of the piston 72. Like the pressure sensing orifice 84, the orifice 99 is situated to sense the decreased pressure due to the flow of fluid through the bore 78 and thereby compensate for the flow reaction force. The diameter 97, upstream of the orifice 99, acts as a baffle to ensure that the orifice senses static pressure only. In addition, the contour of the axial projection 96 and the location of the diameter 97 result in a relatively smooth diversion of the fluid flow to the openings or passages 80.

The orifice 84 in the member 82 and the orifice 99 in the member 90 also act as damping orifices, retarding the movement of the piston 72 in response to pressure pulsation in the system.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a hydraulic system having a source of fluid pressure including a discharge line and having a plurality of hydraulic motors, a priority-type control valve for providing priority to the fluid pressure for at least one of said motors and comprising: a valve body having a cylindrical bore with two different diameters forming two bore portions, the discharge line being connected to the larger diameter bore portion; a first conduit means connecting the larger bore portion to the priority motors; a second conduit means connecting the larger bore portion to the secondary motors; a piston, including two piston portions of different diameters respectively conforming to the different bore diameters and axially slidable therein between a first position wherein it closes the secondary conduit means and a second position wherein it establishes fluid communication between the discharge line and the secondary conduit means; a spring means operably engaging said piston and biasing it toward its first position; and a pressure sensing conduit means interconnecting the two bore portions on opposite sides of said piston, substantially equalizing the fluid pressure on opposite sides of said piston, whereby the difference between the axial forces exerted by the fluid pressure on the larger piston portion in one direction, and the combined axial forces in the opposite direction exerted by the fluid pressure acting on the smaller piston portion and the spring, move the piston between its alternate positions.

2. The invention defined in claim 1 wherein the piston includes an axial bore from the larger diameter end of the piston and a passage means interconnecting said axial piston bore and said second conduit means in said second piston position, and said pressure sensing conduit means includes said axial piston bore and a relatively small orifice adjacent to said passage means for transmitting the fluid pressure at said passage means to the smaller diameter end of said piston.

3. In a hydraulic system having a source of fluid pressure including a discharge line and a plurality of hydraulic motor means, the combination therewith of means for supplying fluid under pressure to said motor means while providing priority to the fluid pressure supply for at least one of said motor means and comprising: a priority conduit means operably interconnecting the discharge line to said priority motor means; a valve body having a cylindrical bore connected to said discharge line and including coaxial bore portions with different diameters; a secondary conduit means operably interconnecting the secondary motor means to said bore; a piston including two piston portions of different diameters respectively conforming to the different bore diameters and axially slidable therein between a first position wherein it closes the secondary conduit means and a second position wherein it allows fluid communication between the discharge line and the secondary conduit means, said piston also including an axial bore extending throughout the length of the piston and a plurality of generally radial apertures adapted to interconnect the piston bore and the second conduit means when the piston is in its second position; a closure member mounted in the piston bore downstream of the radial apertures and including a relatively small orifice interconnecting the piston bore on the opposite sides of the closure member, said orifice and piston bore forming a third conduit means interconnecting the valve bore portions on opposite sides of the piston; and a spring means operably engaging said piston and biasing it toward its first position.

References Cited

UNITED STATES PATENTS

| 2,737,196 | 3/1956 | Eames | 91—412 X |
| 2,859,762 | 11/1958 | Banker | 91—412 X |
| 2,995,141 | 8/1961 | Hipp | 60—52 X |
| 3,033,221 | 5/1962 | Strader | 137—101 |
| 3,210,939 | 10/1965 | Nuss | 137—101 X |

FOREIGN PATENTS

| 1,051,125 | 2/1959 | Germany. |

EDGAR W. GEOGHEGAN, *Primary Examiner.*